(12) United States Patent
Dunagin, Jr.

(10) Patent No.: US 6,834,829 B2
(45) Date of Patent: Dec. 28, 2004

(54) VERTICAL LIFT AIRCRAFT HAVING AN ENCLOSED ROTARY WING

(76) Inventor: Percy E. Dunagin, Jr., 2507 Belle Terre Dr., Statesville, NC (US) 28625

( * ) Notice: Subject to any disclaimer, the term of this patent is extended or adjusted under 35 U.S.C. 154(b) by 0 days.

(21) Appl. No.: 10/334,727

(22) Filed: Jan. 2, 2003

(65) Prior Publication Data

US 2004/0129831 A1 Jul. 8, 2004

(51) Int. Cl.$^7$ .............................................. B64B 1/34
(52) U.S. Cl. ........................... 244/26; 244/24; 244/12.2
(58) Field of Search ............................ 244/12.2, 17.11, 244/24, 26

(56) References Cited

U.S. PATENT DOCUMENTS

| | | | |
|---|---|---|---|
| 1,724,226 A | | 8/1929 | Sorensen |
| 2,547,266 A | * | 4/1951 | Hoglin ....................... 244/12.2 |
| 2,728,537 A | | 12/1955 | Elkins |
| 2,777,649 A | | 1/1957 | Williams |
| 3,061,242 A | | 10/1962 | Zurawinski et al. |
| 3,122,342 A | * | 2/1964 | Weir ........................ 244/17.11 |
| 3,437,290 A | * | 4/1969 | Norman ...................... 244/12.2 |
| 3,572,613 A | * | 3/1971 | Porter ....................... 244/12.2 |
| 3,599,902 A | * | 8/1971 | Thomley ..................... 244/12.2 |
| 3,750,980 A | | 8/1973 | Edwards |
| 3,838,835 A | | 10/1974 | Kling |
| 3,912,201 A | | 10/1975 | Bradbury |
| 4,208,025 A | * | 6/1980 | Jefferson .................... 244/12.2 |
| 4,386,748 A | * | 6/1983 | Jordan ....................... 244/12.2 |
| 4,709,879 A | | 12/1987 | Stafford |
| 4,828,203 A | | 5/1989 | Clifton et al. |
| 5,039,031 A | | 8/1991 | Valverde |
| 5,064,143 A | | 11/1991 | Bucher |
| 5,303,879 A | | 4/1994 | Bucher |
| 5,419,513 A | | 5/1995 | Flemming, Jr. et al. |
| 5,454,531 A | | 10/1995 | Melkuti |
| 5,503,351 A | * | 4/1996 | Vass .......................... 244/12.2 |
| 5,653,404 A | | 8/1997 | Ploshkin |
| 5,738,302 A | | 4/1998 | Freeland |
| 5,746,390 A | * | 5/1998 | Chiappetta ................. 244/12.2 |
| 6,086,016 A | * | 7/2000 | Meek ....................... 244/17.11 |
| 6,450,446 B1 | * | 9/2002 | Holben ...................... 244/12.2 |
| 6,457,670 B1 | * | 10/2002 | Geranio et al. |
| 6,575,402 B1 | * | 6/2003 | Scott ......................... 244/12.2 |
| 6,581,872 B2 | * | 6/2003 | Walmsley .................. 244/12.2 |

* cited by examiner

Primary Examiner—Michael J. Carone
Assistant Examiner—L. Semunegus

(57) ABSTRACT

A vertical lift aircraft comprises a cabin mounted to an enclosed rotary wing which provides vertical lift for the aircraft. The rotary wing includes an annular housing and a main rotor blade rotatable within a space circumscribed by the housing. The main rotor blade is rotatable about a rotation axis that is tilted forwardly from a vertical axis of the aircraft. A horizontal directional control for the aircraft includes a plurality of control slides disposed at spaced locations along the housing and being movable inwardly and outwardly in a radial direction between a neutral position in which the control slides are retracted from the downdraft area and an operational position in which the control slides are extended into the downdraft area. Selective deployment of one or more control slides in the operational position effects horizontal directional turning of the aircraft in the direction of the one or more deployed control slides.

20 Claims, 5 Drawing Sheets

VERTICAL LIFT AIRCRAFT HAVING AN ENCLOSED ROTARY WING

BACKGROUND OF THE INVENTION

1. Field of the Invention

The present invention relates generally to vertical lift rotary wing aircraft and, more particularly, to vertical lift aircraft having an enclosed rotary wing.

2. Brief Description of the Related Art

Vertical lift rotary wing aircraft are generally characterized by a main rotor blade forming a rotary wing for the aircraft and rotatable within a horizontal plane for forcing air downwardly to overcome the force of gravity and create vertical lift capable of rendering the aircraft airborne. Conventional rotary wing aircraft, such as helicopters, typically include a cabin or fuselage, a flexible main rotor blade mounted to the cabin, a tail rotor, vertical and horizontal stabilizers and landing gear. The cabin ordinarily contains an operator control area, a storage area and an engine compartment. The main rotor blade, which comprises the rotary wing for the aircraft, conventionally includes a plurality of main rotor blade members extending radially to a main rotor shaft. The main rotor blade members typically rotate about a central longitudinal axis of the main rotor shaft in a horizontal plane perpendicular to the central longitudinal axis of the main rotor shaft. The main rotor shaft is typically oriented with its central longitudinal axis perpendicular to the ground or other surface on which the landing gear is supported when the aircraft is not in flight. The controls for conventional vertical lift rotary wing aircraft normally comprise a vertical directional control system, a horizontal directional control system and a rotational directional control system. The vertical directional control system typically comprises a collective control stick, usually located at the left hand of the pilot or operator, connected to pitch controls located about the main rotor shaft to control vertical movements of the aircraft. Ordinarily the pitch controls mechanically connect the collective control stick to the main rotor blade to effect changes in the pitch of the main rotor blade symmetrically to vary or alter vertical lift. The horizontal directional control system typically comprises a cyclic control stick, normally located at the operator's right hand, for controlling the horizontal direction of the aircraft. In many cases, horizontal directional control is effected via control rods connected to swash plates located on the main rotor shaft. The rotational directional control system typically comprises rudder foot pedals for operating the tail rotor to control yaw, i.e. rotation of the aircraft about its vertical axis, during slow flight or hovering.

Conventional rotary wing aircraft, primarily helicopters, exhibit noise, vibration, turbulence, a lack of safety and limited forward speed due to inadequacies in the main rotor blade control systems and the need to compensate for the differential effect of the wind on advancing and retreating main rotor blade members during forward flight. In conventional rotary wing aircraft such as helicopters, the horizontal directional control system usually requires a complicated system located about the main rotor shaft and which acts by reducing the pitch of each main rotor blade member on one side of the aircraft and increasing the pitch on the other side of the aircraft within a single rotational cycle, i.e. one complete rotation of the main rotor blade, to provide more lift in a desired direction. As a result, the potential for lift is negated or wasted on one side of the aircraft, causing a dynamic imbalance. The main rotor blade members thusly do not operate at maximum efficiency and power in that a significant amount of lift is lost from the total lift generated by the main rotor blade when effecting horizontal directional changes for the aircraft. In addition, vibration, turbulence and noise are created due to the main rotor blade members changing their pitch as they rotate. Since the main rotor blade in conventional rotary wing aircraft is not isolated from the relative wind, the main rotor blade exhibits flapping due to the differential speed between the advancing and retreating main rotor blade members caused by the relative wind meeting the advancing and retreating main rotor blade members during forward flight. Flapping of the main rotor blade inhibits lift and produces turbulence, vibration and noise. Also, the speed at the tips of advancing main rotor blade members must generally be reduced to a speed which, when combined with the speed of the relative wind, does not exceed the speed of sound. The need to reduce the advancing main rotor blade member tip speed decreases lift and further contributes to noise, vibration and turbulence. The turbulence, vibration and noise characteristic of conventional rotary wing aircraft contributes to pilot fatigue and stress, thereby limiting pilot endurance and increasing the chance for pilot error. The decreased centrifugal force resulting from a lowering of the main rotor blade tip speed increases coning (dihedral) of the main rotor blade plane and thusly impairs the stability of the main rotor blade plane with a concomitant reduction in lift. The requisite reduction in main rotor blade member tip speed requires that the overall speed of the aircraft also be reduced. Since each main rotor blade member does not have a constant pitch throughout all rotation angles, each main rotor blade member does not contribute its entire force to increasing lift during both hovering and forward movement.

Various types of vertical lift rotary wing aircraft have been proposed, as represented by U.S. Pat. No. 1,724,226 to Sorensen, U.S. Pat. No. 2,728,537 to Elkins, U.S. Pat. No. 2,777,649 to Williams, U.S. Pat. No. 3,750,980 to Edwards, U.S. Pat. No. 3,912,201 to Bradbury and U.S. Pat. No. 5,064,143 to Bucher. The Sorensen, Williams and Bucher patents disclose rotor blades at least partly enclosed in a housing, but are characterized by heavy and/or complicated structure as well as complex operational designs. Previously proposed vertical lift rotary wing aircraft having enclosed rotary wings utilize rigid main rotor blades that lack the ability to change pitch on the main rotor blades for rapid changes in vertical movements of the aircraft and/or lack the ability to perform an emergency auto-rotation with the aircraft. In order to be maximally effective, the control devices for the main rotor blades of previously proposed vertical lift rotary wing aircraft with enclosed rotary wings must be undesirably located close to the plane of the main rotor blades. Some prior vertical lift rotary wing aircraft with enclosed rotary wings employ a rigid, centrally reinforced and weighted ducted fan system with non-variable pitch main rotor blades, and some prior enclosed vertical lift rotary wing aircraft employ rotor blade systems having non-variable pitch rotor blades supported by rollers at the blade tips. Systems of the latter type are very heavy and also produce considerable resistance to the downdraft, resulting in decreased vertical lift. Many ducted fan systems disadvantageously require complex computer-controlled directional flaps.

In view of the above, there is a need for a vertical lift rotary wing aircraft with an enclosed rotary wing and which exhibits greater lift, forward speed and safety while reducing vibration, noise and turbulence. There is also a need for a vertical lift rotary wing aircraft with an enclosed rotary wing comprising a flexible main rotor blade of variable pitch to achieve rapid changes in vertical movements while horizontal directional control is accomplished without asymmetrical changes in pitch of the main rotor blade members which cause a dynamic imbalance. There is a further need for a vertical lift rotary wing aircraft with an enclosed rotary wing and permitting higher main rotor blade tip speed, permitting the pitch of each main rotor blade member to remain at the same setting through a single cycle, and reducing main rotor blade coning or dihedral.

SUMMARY OF THE INVENTION

Accordingly, it is a primary object of the present invention to overcome the aforementioned disadvantages of prior vertical lift rotary wing aircraft, such as conventional helicopters, as well as prior vertical lift rotary wing aircraft having an enclosed rotary wing.

Another object of the present invention is to increase lift and forward speed in a vertical lift rotary wing aircraft.

A further object of the present invention is to reduce vibration, noise and turbulence in a vertical lift rotary wing aircraft.

An additional object of the present invention is to increase safety in a vertical lift rotary wing aircraft by alleviating conditions that contribute to pilot stress and fatigue.

It is also an object of the present invention to increase safety in a vertical lift rotary wing aircraft having an enclosed rotary wing by permitting emergency auto-rotation of the aircraft to effect a safe landing.

Still another object of the present invention is to eliminate the need for asymmetrical pitch changes in the main rotor blade of a vertical lift rotary wing aircraft in order to achieve horizontal directional control.

Moreover, it is an object of the present invention to permit the main rotor blade tip speed to be increased to just below the speed of sound in a vertical lift rotary wing aircraft.

The present invention also has as an object to increase the stability of the main rotor blade plane in a vertical lift rotary wing aircraft.

Yet a further object of the present invention is to simplify horizontal directional control in a vertical lift rotary wing aircraft.

Additionally, it is an object of the present invention to isolate the main rotor blade of a vertical lift rotary wing aircraft from relative wind.

Some of the advantages of the present invention are that simple, relatively lightweight, variable pitch, flexible main rotor blades similar to those conventionally used in helicopters may be utilized in the vertical lift rotary wing aircraft; the flexible main rotor blade permits rapid changes in vertical movement of the aircraft to be effected; the use of a peripherally weighted, high momentum kinetic energy, rapidly responsive, variable pitch main rotor blade in a circumferential enclosure or housing permits execution by the vertical lift rotary wing aircraft of an emergency auto-rotation maneuver for safe landings in emergency situations; the vertical lift rotary wing aircraft is controlled in a manner similar to that of conventional helicopters so as to be familiar to pilots and avoid the need for extensive pilot training; the vertical lift rotary wing aircraft may include a rudder flap, elevator flaps and/or aileron flaps not normally found in conventional vertical lift rotary wing aircraft; horizontal directional control may be enhanced at sufficiently high forward speeds by the aileron, elevator and rudder flaps while the downdraft area remains open; the circumferential housing for the main rotor blade acts as an airfoil; at sufficiently high forward speeds, the housing contributes to stability of the aircraft, provides additional lift and allows virtually all of the main rotor blade power to be expended for forward speed; a horizontal orientation for the aircraft is permitted during forward flight while part of the aircraft's power is dedicated to forward thrust; the control devices for horizontal directional control are advantageously located in the housing; the differential speed between advancing and retreating main rotor blade members is avoided; the tip speed of advancing main rotor blade members does not have to be reduced to a speed which, when combined with the speed of the relative wind does not exceed the speed of sound; the tip speed may be increased to just below the speed of sound, thereby increasing the stability of the main rotor blade plane, increasing lift and reducing noise, vibration, turbulence and operator fatigue; increased centrifugal force of the man rotor blade increases the stability of the main rotor blade plane and further increases lift; the overall speed of the vertical lift rotary wing aircraft can approach the speed of sound; the main rotor blade members have a constant pitch throughout all rotation angles so that each main rotor blade member contributes its entire force to increasing lift during both hovering and forward movements; each main rotor blade member operates at maximum efficiency and power; minimal lift is lost from the total lift of the aircraft when executing directional changes; the housing may be used to store emergency parachutes and flotation devices which are protected by the housing from contacting the rotating main rotor blade; safety is increased since the housing assists in preventing inadvertent contact with the rotating main rotor blade; the control devices are extendable radially outwardly and radially inwardly from the housing to achieve horizontal directional control in a radially inwardly extended position by obstructing a selected portion of the downdraft area while the control devices in a radially outwardly extended position increase stability of the aircraft and promote lift during forward flight; only a small portion of the downdraft area needs to be obstructed with the control devices to obtain horizontal directional control; banking in a desired direction may be facilitated via the use of the aileron flaps, which also provide drag to assist the rudder flap in controlling slipping and sliding during banking; the cabin may be located below or above the enclosed rotary wing; the housing may contain sealed air pockets which would enable the aircraft to float in water for emergency flotation; engine or motor power may be provided by a conventional reciprocating, turbo jet or jet engine; as an alternative to a tail rotor blade, a counter rotating rotor blade may be used in conjunction with the main rotor blade to control rotation of the aircraft about its vertical axis; and the tail rotor blade may also be shrouded for safety purposes for isolation from the main rotor blade wash and/or from the effects of the relative wind.

These and other objects, advantages and benefits are realized with the present invention as generally characterized in a vertical lift rotary wing aircraft comprising a cabin and a rotary wing mounted on the cabin to provide vertical lift for the aircraft. The cabin typically includes a cockpit or operator area containing a seat for a pilot or operator and a collective control, a rudder control and a cyclic control for use by the pilot to respectively control vertical, rotational and horizontal directional movements of the aircraft in flight. The rotary wing comprises an annular housing or enclosure and a main rotor blade rotatably disposed within the space circumscribed by an inner circumference of the housing. The main rotor blade is preferably a flexible main rotor blade of variable pitch whereby the pitch of the main rotor blade may be adjusted symmetrically via the collective control to control vertical directional movements of the aircraft. The space includes a downdraft area beneath the main rotor blade, and a horizontal directional control mechanism for the aircraft comprises a plurality of control slides spaced along the housing for retraction from and extension into the downdraft area. The control slides are slidably mounted in radial slots in the housing at 90 degree spaced locations and preferably there is a control slide at a forward location, a rearward location, a port location and a starboard location. The control slides have a neutral or retracted position in which the control slides are retracted radially outwardly from the downdraft area. The control slides are movable from the neutral position to an operational or extended position in which the control slides are extended radially inwardly into the downdraft area. In its operational position, each control slide preferably obstructs about four to five percent of the downdraft area. The control slides are preferably supported in the slots between upper and lower rollers, and an operating member is provided for each control slide by which the control slide is moved between the neutral and operational positions. The operating members may include a roller for each control slide, each roller being disposed in engagement with its corresponding control slide. The rollers are rotatable in a first direction to effect sliding movement of the control slides radially outwardly to the neutral position and are rotatable in a second direction to effect sliding movement of the control slides radially inwardly to the operational position. Each operating member preferably includes a servo mechanism operated via the cyclic control. When a selected one of the control slides is moved from the neutral position to the operational position while the aircraft is in flight, horizontal directional turning movement of the aircraft is effected in the direction of the control slide that has been moved to the operational position. When a pair of adjacent control slides are moved from the neutral position to the operational position while the aircraft is in flight, horizontal directional turning movement of the aircraft is effected in a direction between the pair of adjacent control slides that have been moved to the operational position. Horizontal directional control of the aircraft is accomplished via the control slides without asymmetrical pitch changes of the main rotor blade, thereby allowing the full effort of the main rotor blade to be used for lift and forward thrust. The housing isolates the main rotor blade from the relative wind such that flapping of the main rotor blade with its concomitant noise, vibration and turbulence is avoided.

Other objects and advantages of the present invention will become apparent from the following description of the preferred embodiments taken in conjunction with the accompanying drawings, wherein like parts in each of the several figures are identified by the same reference characters.

DESCRIPTION OF THE PREFERRED EMBODIMENTS

Figure 1:
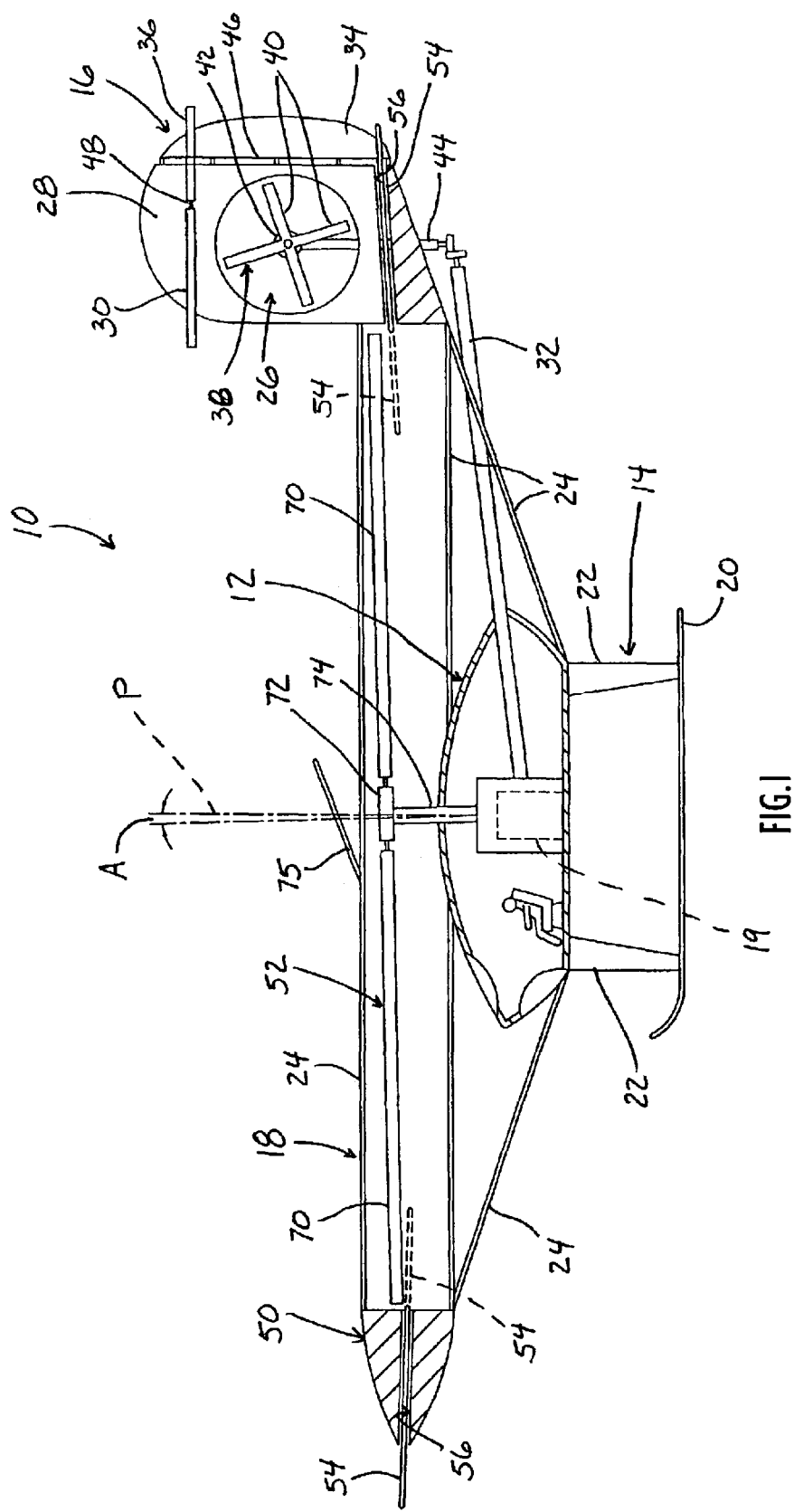
FIG. 1 is a side view, partly in section, of a vertical lift aircraft having an enclosed rotary wing according to the present invention.
Figure 2:
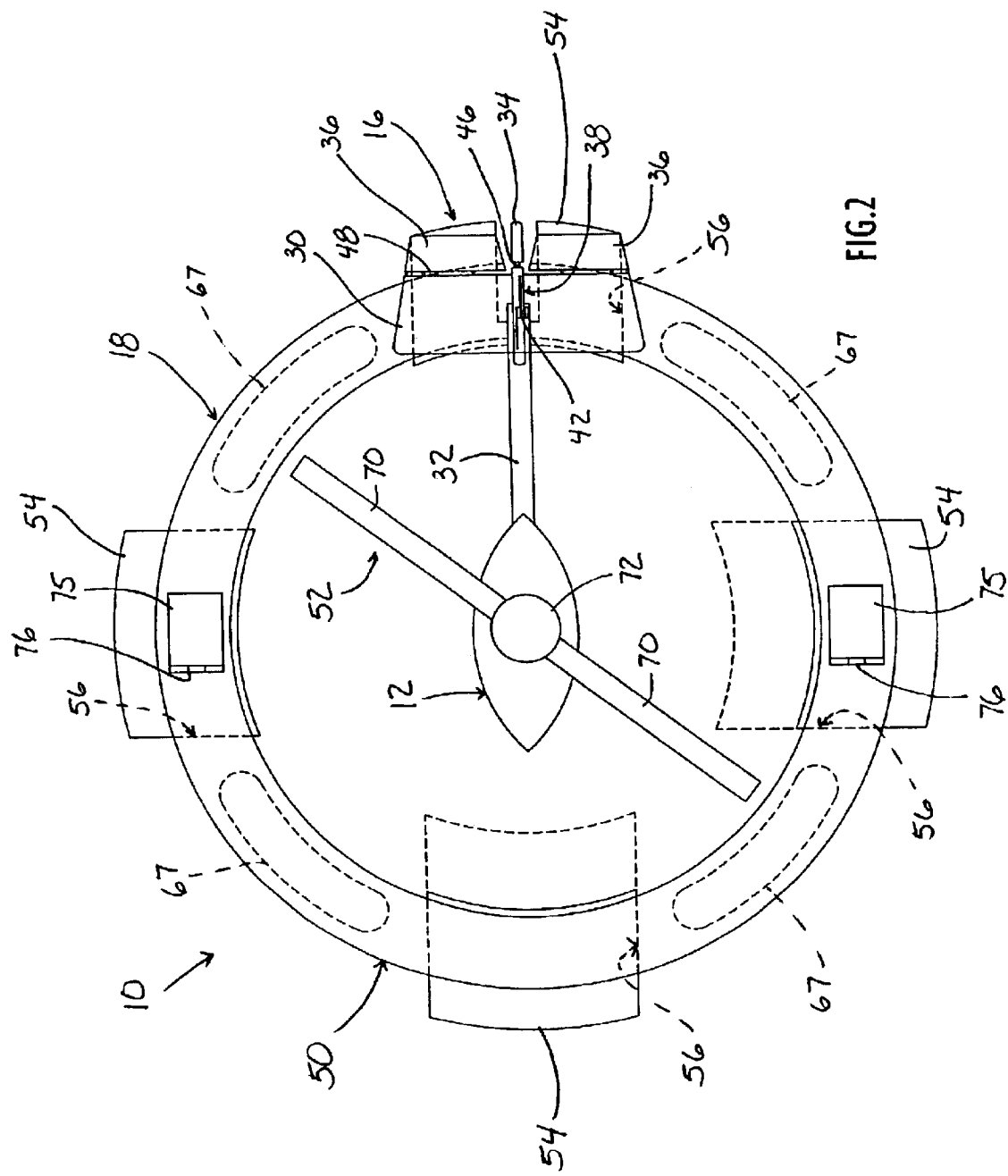
FIG. 2 is a top view of the vertical lift aircraft having an enclosed rotary wing.
Figure 3:
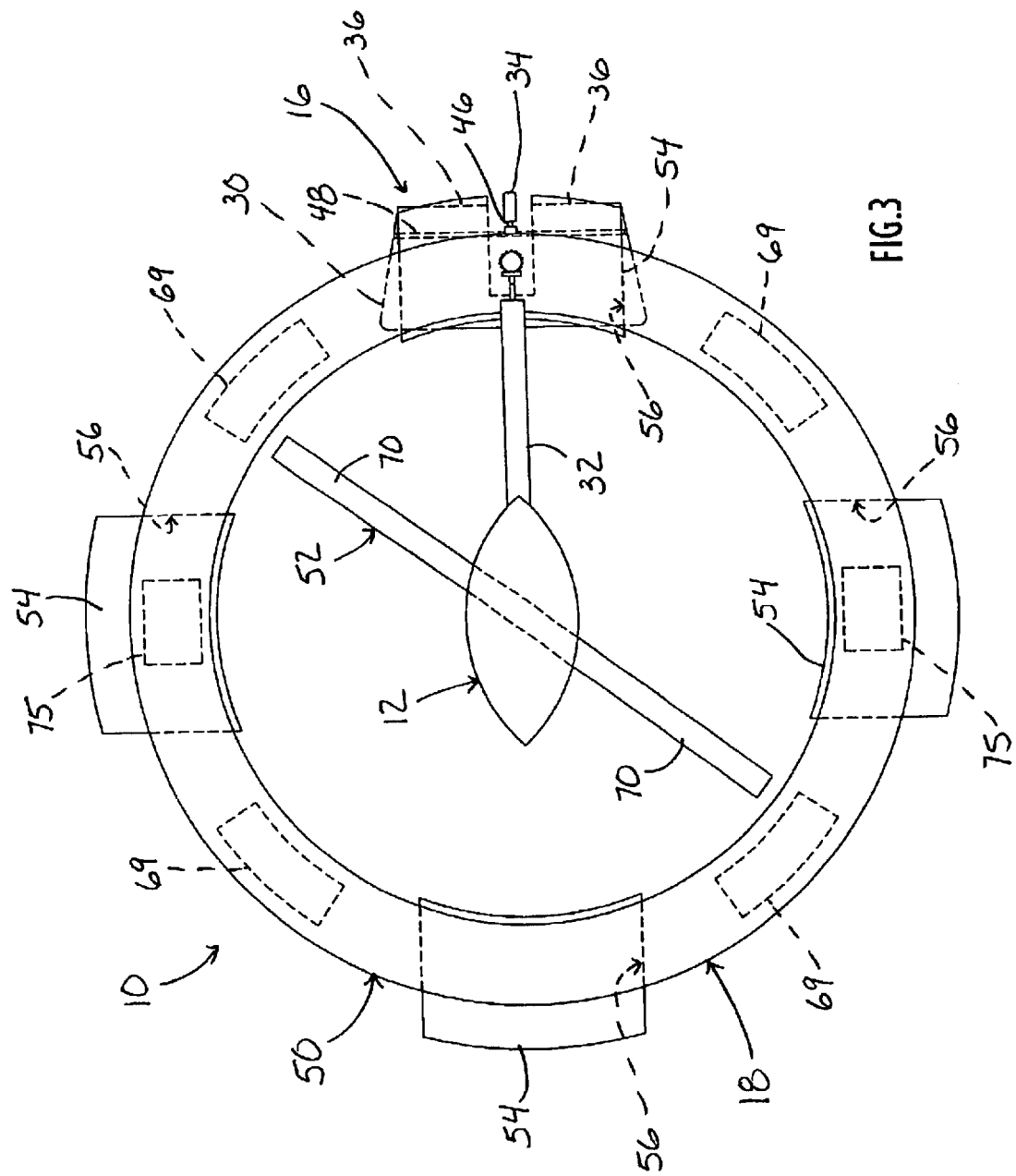
FIG. 3 is a bottom view of the vertical lift aircraft having an enclosed rotary wing.

A vertical lift rotary wing aircraft 10 according to the present invention is illustrated in FIGS. 1–3. The vertical lift rotary wing aircraft 10 comprises a cabin or fuselage 12, landing gear 14 mounted on the cabin 12, a tail 16 and an enclosed rotary wing 18. The cabin 12 can be designed in various ways to enclose one or more compartments or areas such as a cockpit or operator area for a pilot or operator, a passenger compartment, a storage compartment and a power source or engine compartment. The cockpit will typically be located at the front of the cabin and will typically include a transparent front windshield to permit visualization by the pilot. Of course, the cabin may include one or more doors or access openings and/or windows at any suitable locations. The cabin 12 may have an external configuration of an airfoil or other aerodynamic shape as shown in the drawings. The power source compartment may contain one or more power sources 19, such as engines or motors for powering the aircraft. The one or more power sources 19 may include reciprocating, turbojet or jet engines. The landing gear 14 may comprise a plurality of runners 20 and connecting members 22 connecting the runners to the bottom of the cabin 12 as conventionally found on helicopters. The aircraft 10 has a pair of parallel runners 20, only one of which is visible in FIG. 1, extending longitudinally to the aircraft parallel with a horizontal or longitudinal axis of the aircraft. The landing gear 14 and connecting members 22 are not shown in FIGS. 2 and 3 for the sake of simplicity. The landing gear 14 is disposed beneath the cabin 12 and, when the aircraft is not in flight, the runners 20 are supported on the ground or other surface.

The tail 16 is structurally connected to the cabin 12 via one or more support members 24, such as struts. Any suitable number of support members 24 at any suitable locations may be provided in the aircraft 10 for supporting the tail 16 relative to the cabin 12. The tail 16 comprises a tail rotor 26, a vertical stabilizer 28 and a horizontal stabilizer 30 as may be found in vertical lift rotary wing aircraft such as helicopters. The vertical stabilizer 28 is not shown in FIG. 2 to permit visualization of the tail rotor. The tail rotor 26 is mechanically coupled with the power source via a tail boom 32. The tail 16 further includes features not normally found in the tails of conventional vertical lift rotary wing aircraft and these features include a rudder flap 34 and elevator flaps 36. The tail rotor 26 comprises a tail rotor blade 38 including a plurality of tail rotor blade members 40 extending radial to a tail rotor blade shaft 42. The tail rotor blade 38 is rotatable within a vertical longitudinal plane that bisects the aircraft longitudinally, with the tail rotor blade rotating about a central longitudinal axis of the tail rotor blade shaft 42 perpendicular to the vertical longitudinal plane. The tail rotor blade 38 is rotatable via a rotatable drive shaft 44 coupled via appropriate gearing to the tail rotor blade shaft 42 and to the tail boom 32 which is driven by the power source to rotate the tail rotor blade. The vertical stabilizer 28 is in line with the vertical longitudinal plane, with the horizontal stabilizer 30 being perpendicular to the vertical stabilizer and bisected by the vertical longitudinal plane. The horizontal stabilizer 30 is located above the tail rotor 26, and the vertical stabilizer 28 protrudes upwardly beyond the horizontal stabilizer. The rudder flap 34 is disposed rearwardly of the tail rotor and has a neutral position in the vertical longitudinal plane while being pivotal about a pivot 46 from the neutral position. The elevator flaps 36 are disposed on each side of rudder flap 34 and have a neutral position in a horizontal plane perpendicular to the vertical longitudinal plane while being pivotal from the neutral position about a pivot 48. As in a conventional helicopter, the tail rotor 26 is used for rotational directional control to control yaw, i.e. rotation of the aircraft about its vertical axis, during slow flight or hovering of the aircraft. The rudder flap 34 and elevator flaps 36, in conjunction with aileron flaps discussed below, are used to enhance horizontal directional control when the aircraft is at a sufficiently high forward speed.

The enclosed rotary wing 18 provides vertical lift for the aircraft 10, allowing the aircraft to take off vertically and become airborne in flight. The enclosed rotary wing 18 comprises an annular enclosure or housing 50 and a main rotor blade 52 rotatably mounted within the space circumscribed by the housing. The housing 50 has an inner circumference circumscribing the space containing the main rotor blade 52 and has an outer circumference. The space is open at the top and bottom of the housing to allow air flow through the housing. The housing is tapered in height from the inner circumference to the outer circumference, the height being defined between an upper surface and a lower surface of the housing. The upper surface curves outwardly, upwardly from the outer circumference to the inner circumference, and the lower surface extends angularly, downwardly from the outer circumference to the inner circumference so that the housing has a configuration of an airfoil. The housing 50 is mounted or supported relative to the cabin 12 and the tail 16 by support members 24, the support members 24 being eliminated from FIGS. 2 and 3 for the sake of simplicity. Any suitable number of support members 24 at any suitable locations can be provided in the aircraft 10 for supporting the rotary wing 18 relative to the cabin 12 and the tail 16. The tail 16 is mounted on the housing 50 at the rear of the aircraft with the tail rotor blade 38 disposed above the housing. Of course, the housing 50 can be provided with one or more suitable openings or passages, as needed, to accommodate one or more components of the tail 16 and the tail boom 32. The tail can be mounted on the housing in various ways and may be formed as part of the housing. The tail boom 32 is illustrated in FIG. 1 as being disposed beneath the housing 50 and as extending from a power source compartment in the cabin 12 to an end provided with gearing in engagement with gearing located at an end of drive shaft 44 projecting below the housing.

The rotary wing 18 comprises a horizontal directional control mechanism including control slides or devices 54 slidably mounted in the housing 50 at 90 degree spaced locations corresponding to the cardinal directions. A first control slide is disposed at the rear of the aircraft in line with tail 16 and bisected by the vertical longitudinal plane; a second control slide is located at the front of the aircraft; a third control slide is disposed on the port side of the aircraft; and a fourth control slide is disposed on the starboard side of the aircraft. The second control slide may be bisected by the vertical longitudinal plane, and the third and fourth control slides may be bisected by a vertical lateral plane perpendicular to the vertical longitudinal plane. Each control slide 54 comprises a preferably lightweight, flat or planar plate slidable in a corresponding radial slot 56 in the housing 50. Each control slide has an inner edge with an arcuate configuration corresponding to the inner circumference of housing 50 and an outer edge with an arcuate configuration corresponding to the outer circumference of housing 50. Each control slide 54 has straight, parallel side edges connecting the inner edge to the outer edge. Each slot 56 is open along the inner circumference and along the outer circumference of the housing 50 and has straight, parallel side walls extending from the inner circumference to the outer circumference. The slots 56 may be angled downwardly from the outer circumference to the inner circumference of the housing 50. Each control slide 54 is confined laterally between the side walls of its corresponding slot 56 while being slidable in a direction radial to the center of housing 50. The control slides 54 have a neutral or fully retracted position shown in FIGS. 1–4, in which the inner edges of the control slides are adjacent the inner circumference of the housing 50 and the outer edges of the control slides are spaced outwardly from the outer circumference of the housing. Accordingly, in the neutral position for the control slides, each control slide is extended in a radial direction beyond the outer circumference of the housing so that the control slides protrude outwardly from the housing. Each control slide 54 is selectively movable from its neutral position to an operational or fully extended position in which the inner edges of the control slides are spaced further inwardly of the inner circumference of the housing 50 such that the control slides in their operational position extend radially inwardly from the housing so as to block or obstruct a portion of the space circumscribed by the housing 50 as shown in dotted lines in FIG. 2 for the front and port control slides. Of course, it should be appreciated that various intermediate extended positions for the control slides 54 are possible between the neutral and operational positions, and the "operational position" for the control slides is intended to encompass a fully extended position as well as intermediate extended positions. The first control slide located at the rear of the aircraft may be provided with one or more slots, as needed, to accommodate the rudder flap and/or any other components of the tail as seen in FIG. 2.

Figure 4:
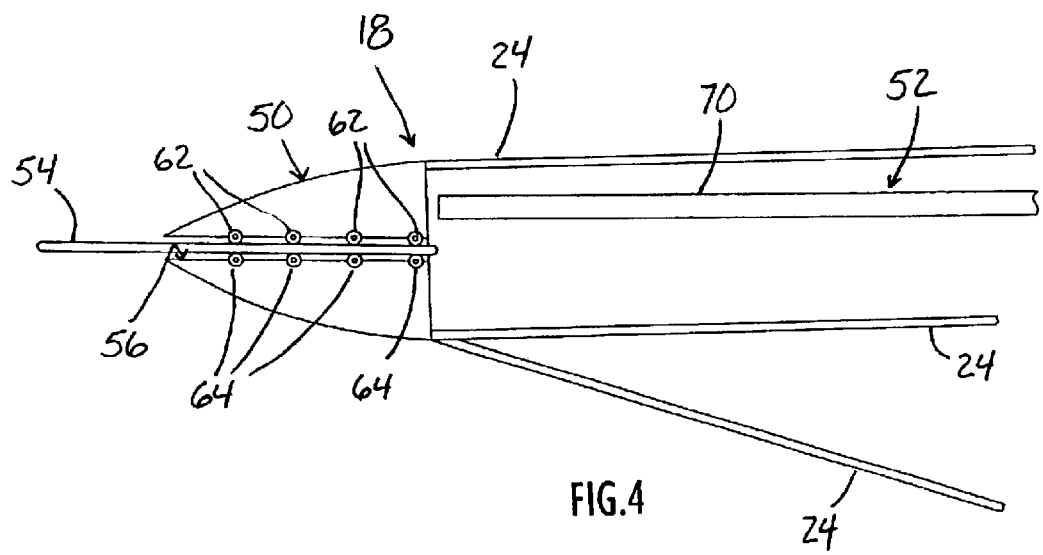
FIG. 4 is a broken side view, partly in section, of the vertical lift aircraft having an enclosed rotary wing and depicting a control slide of the aircraft in a neutral position in which the control slide is retracted from the downdraft area of the aircraft.
Figure 5:
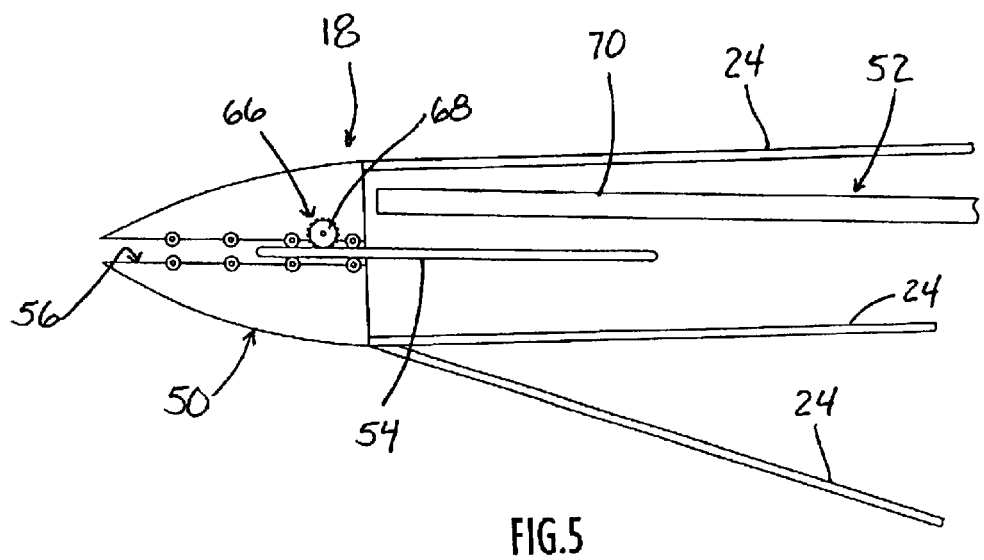
FIG. 5 is a broken side view, partly in section, of the vertical lift aircraft having an enclosed rotary wing and depicting the control slide in an operational position in which the control slide is extended into the downdraft area.

As shown in FIGS. 4 and 5, each control slide 54 is supported in its corresponding slot 56 between a plurality of upper guide rollers 62 along an upper surface of the corresponding slot and a plurality of lower guide rollers 64 along a lower surface of the corresponding slot. The upper and lower rollers are not shown in FIG. 1 for the sake of simplicity. Each control slide 54 is disposed between the upper and lower guide rollers 62,64 with the upper guide rollers 62 in contact with an upper surface of the control slide and the lower guide rollers 64 in contact with a lower surface of the control slide. The upper and lower guide rollers 62,64 are rotatable in clockwise and counterclockwise directions about central longitudinal axes, respectively, perpendicular to the radial direction of movement of the control slides between the neutral and operational positions such that rotation of the upper and lower guide rollers occurs in the radial direction of movement. The upper guide rollers 62 rotate in a direction opposite the direction of rotation for the lower guide rollers 64 as the control slides move radially outwardly and radially inwardly to obtain the neutral and operational positions. For example, the upper guide rollers 62 rotate clockwise and the lower guide rollers 64 rotate counterclockwise from the viewpoint of FIGS. 4 and 5 when the control slides 54 move outwardly in the radial direction of movement toward the neutral position. Conversely, the upper guide rollers 62 rotate counterclockwise and the lower guide rollers 64 rotate clockwise from the viewpoint of FIGS. 4 and 5 when the control slides 54 move inwardly in the radial direction of movement toward the operational position. The upper and lower guide rollers 62,64 guide and stabilize the control slides and maintain proper alignment of the control slides in the slots as the control slides move to and from the neutral and operational positions. The surfaces of the guide rollers 62,64 in contact with the control slides and/or the surfaces of the control slides in contact with the guide rollers may be made of a low-friction material to promote sliding movement of the control slide in the radial direction.

FIG. 5 illustrates an operating mechanism 66 for each control slide 54 for selectively moving the control slides to and from the neutral and operational positions as well as intermediate positions between the neutral and operational positions. For the sake of simplicity, the operating mechanisms are not shown in FIGS. 1 and 4. The operating mechanism 66 for each control slide 54 comprises a servo mechanism including an operating roller 68 mounted in frictional or mechanical engagement with the control slide. The operating roller 68 is rotatable in clockwise and counterclockwise directions about a central longitudinal axis perpendicular to the radial direction of movement of the control slide. In FIG. 5, the operating roller 68 is depicted in engagement with an upper surface of the control slide; however, the operating roller 68 may be disposed in engagement with a lower surface of the control slide. The operating roller 68 may be provided with gear or ratchet teeth as shown in FIG. 5 meshing with corresponding gear or ratchet teeth provided along the surface of the control slide. Clockwise rotation of the operating roller 68 about its central longitudinal axis occurs in the radially outward direction, causing the control slide 54 in engagement therewith to be moved radially outwardly toward the neutral position. Counterclockwise rotation of the operating roller 68 about its central longitudinal axis occurs in the radially inward direction, causing the control slide in engagement therewith to be moved radially inwardly toward the operational position. The servo mechanism will typically include a motor for rotating the operating roller 68 in a desired direction in response to the pilot operating a horizontal directional control for the aircraft as explained below in greater detail. Of course, it should be appreciated that various types of operating mechanisms designed in many various ways can be provided in the aircraft for moving selected ones of the control slides to the neutral and operational positions independently or in tandem.

The housing 50 may contain sealed air pockets 67, shown in dotted lines in FIG. 2, for flotation in water. As shown in dotted lines in FIG. 3, the housing 50 may contain one or more storage compartments 69.

The main rotor blade 52 comprises a plurality of main rotor blade members 70 radially mounted to a central hub 72 coupled with a main rotor blade shaft 74. The main rotor blade shaft 74 is rotatably driven by the aircraft power source to rotate the main rotor blade 52 about a central longitudinal axis of the main rotor blade shaft 74. The main rotor blade 52 is preferably a relatively lightweight, flexible rotor blade with peripherally weighted, high momentum kinetic energy, rapidly responsive, variable pitch main rotor blade members as conventionally found on helicopters. The main rotor blade 52 is rotatable in a horizontal plane perpendicular to a central longitudinal axis of the main rotor blade shaft 74. In conventional helicopters, the main rotor blade shaft is perpendicular to the longitudinal axis of the aircraft so that the horizontal plane of the main rotor blade is parallel to the aircraft longitudinal axis. In the vertical lift aircraft 10, the main rotor blade shaft 74 is non-perpendicular to the longitudinal axis of the aircraft and is permanently tilted forward an angle A of about three to five degrees from vertical. Accordingly, the central longitudinal axis of the main rotor blade shaft 74 is angled forwardly angle A of about three to five degrees relative to a vertical plane P perpendicular to the longitudinal axis of the aircraft as shown in FIG. 1. The main rotor blade 52 is disposed in the space circumscribed by housing 50 such that the main rotor blade members 72 are disposed over and above the control slides 54 in the operational position as shown in dotted lines in FIG. 1 and as also shown in FIG. 5. The space circumscribed by housing 50 includes a downdraft area, i.e. the empty or unoccupied space below the main rotor blade 52. Accordingly, a control slide 54 in its operational position is disposed in and obstructs a portion of the downdraft area with the control slide being disposed close to the main rotor blade.

The enclosed rotary wing 18 further comprises aileron flaps 75 mounted on an upper surface of housing 50 at the port and starboard locations, respectively, as best depicted in FIGS. 1 and 2. Each aileron flap 75 includes a planar flap having a forward edge pivotally mounted to the housing 50 via a pivot 76. The flaps 75 are pivotal relative to the housing 50 about pivots 76 from a neutral position in which the flaps 75 lie flat against the housing to an operational position in which the flaps extend angularly upwardly from the housing as shown in FIG. 1.

Figure 6:
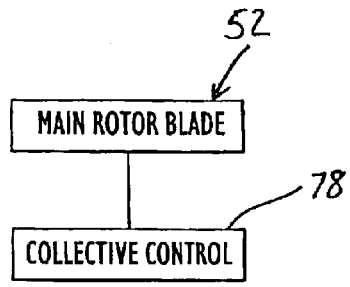
FIG. 6 is a block diagram depicting vertical directional control for the vertical lift aircraft.
Figure 7:
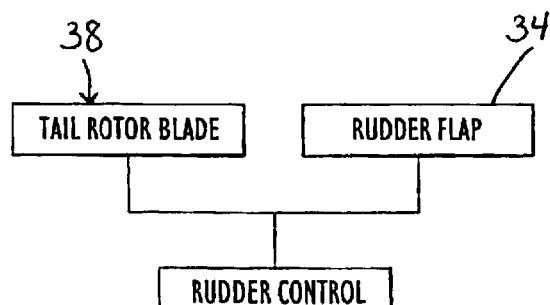
FIG. 7 is a block diagram depicting rotational directional control for the vertical lift aircraft.

The vertical lift rotary wing aircraft 10 includes a vertical directional control and a rotational or yaw directional control similar to those found in conventional helicopters. The vertical directional control is depicted schematically in FIG. 6 and comprises a collective control 78, typically a collective control stick located in the cockpit at the left hand of the operator, connected to pitch controls located about the main rotor blade shaft. The collective control operates via the pitch controls to change pitch on the main rotor blade 52 symmetrically in order to achieve changes in movement of the aircraft in the vertical direction. Rapid changes in vertical movements of the aircraft 10 is possible since the aircraft 10 utilizes a flexible, variable pitch main rotor blade. Rotational or yaw directional control, i.e. rotation of the aircraft about its vertical axis, is controlled during slow flight or hovering by means of the tail rotor 26, as operated via a rudder control 80 typically comprising rudder pedals disposed in the cockpit as represented by FIG. 7. The rudder pedal allows the pilot to operate the tail rotor blade 38 via the tail boom 32 and drive shaft 44. Of course, the rudder control 80 can also be used to selectively pivot the rudder flap 34.

Figure 8:
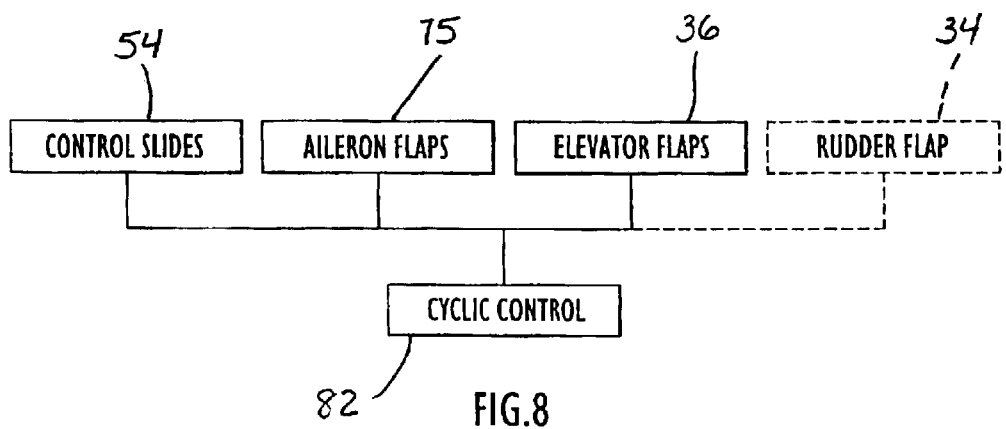
FIG. 8 is a block diagram representative of horizontal directional control for the vertical lift aircraft.

In a conventional helicopter, horizontal directional control is accomplished with a cyclic control, typically a cyclic control stick located in the cockpit at the right hand of the pilot, and which is coupled with the main rotor blade to effect pitch changes in the main rotor blade asymmetrically to control the horizontal direction of the aircraft. The horizontal directional control for the vertical lift aircraft 10 of the present invention is illustrated in FIG. 8 and comprises a cyclic control 82, which may be a cyclic control stick as found in conventional helicopters, coupled with the control slides 54 as well as being coupled with the aileron flaps 75 and the elevator flaps 36. The cyclic control 82 may be coupled with the control slides 54, the aileron flaps 75 and the elevator flaps 36 in various ways including mechanically, electrically and/or hydraulically. Mechanical connections may include cables, pulleys and/or springs. The servo mechanism of the operating mechanism 66 may be electrically connected to the cyclic control 82. The cyclic control 82 is used to selectively pivot the aileron flaps 75 and the elevator flaps 36 between their neutral and operational positions. As represented by dotted lines in FIG. 8, the cyclic control 82 may be designed to operate the rudder flap 34. The cyclic control 82 is also used to move a selected one or more of the control slides 54 from the neutral position toward the operational position, primarily during hovering, to reduce lift by blocking a portion or portions of the downdraft area resulting in turning of the aircraft in the direction of the blocked portion or portions of the downdraft area. Where a single selected control slide 54 is moved to the operational position, horizontal turning movement of the aircraft 10 will be effected in the cardinal direction corresponding to the selected control slide. Where any two circumferentially adjacent control slides 54 are moved simultaneously to the operational position, horizontal turning movement of the aircraft 10 will be effected in a direction between the cardinal directions of the adjacent control slides.

Each control slide 54 in the operational position will block about four to five percent of the total downdraft area. In order to deploy a control slide in the operational position, the cyclic control stick need only be moved in the direction of the control slide; and, in order to deploy two circumferentially adjacent control slides in the operational position, the cyclic control stick need only be moved in the direction between the cardinal directions of the adjacent control slides. The control slides 54 operate by obstructing or neutralizing portions of the downdraft area as opposed to deflecting the direction of the downward thrust. The control slides 54 will be deployed in the operational position after the main rotor blade members 70 have been elevated during maximum RPM as illustrated in FIG. 5. A minimum of lift is lost from the total lift generated by the main rotor blade 52 in exercising horizontal directional changes, and the dynamic imbalance resulting from asymmetrical pitch changes of the main rotor blade is eliminated along with the concomitant vibration, turbulence and noise. During horizontal directional changes, the main rotor blade 52 maintains the same pitch throughout its entire cycle, allowing each main rotor blade member to operate at maximum efficiency and power. Thus, the main rotor blade members 70 are able to achieve maximum lift in all positions in each rotational cycle. At sufficiently high forward speeds, horizontal directional control is enhanced by the aileron flaps 75, the elevator flaps 36 and the rudder flap 34 so that little input from the control slides is necessary whereby the downdraft area may be left open or unobstructed. In this situation, virtually all of the main rotor blade power will be expended for forward speed since the housing 50 acts as an airfoil at high speeds and further stabilizes the aircraft to provide for additional lift. The main rotor blade shaft 74 being tilted forwardly angle A permits the aircraft to be oriented horizontally during forward flight while devoting part of the aircraft's power to forward thrust. Since each of the main rotor blade members 70 has a constant pitch throughout all rotation angles, each main rotor blade member contributes its entire force to increasing lift during both hovering and forward movement.

The housing 50 isolates the main rotor blade 52 from the relative wind during forward flight and eliminates the differential speed between the advancing and retreating main rotor blade members, thereby eliminating flapping which causes turbulence, vibration and noise. Enclosure of the main rotor blade 52 within the housing 50 also eliminates the need to reduce the tip speed of an advancing main rotor blade member to a speed which, when combined with the speed of the relative wind, does not exceed the speed of sound. In the vertical lift aircraft 10, the main rotor blade tip speed may be increased to just below the speed of sound, thereby increasing the stability of the main rotor blade plane, increasing lift, and reducing noise, vibration and turbulence as well as associated pilot fatigue. The increased centrifugal force associated with higher rotor blade tip speeds lowers the coning effect (dihedral) of the main rotor blade plane and also serves to further increase lift. The overall speed of the vertical lift aircraft 10 can approach the speed of sound since it is no longer limited to the sum of the relative wind and the advancing main rotor blade tip speed. Since the main rotor blade is protected by the housing, emergency parachutes and/or flotation devices may be safely stored in the storage compartments 69 and deployed as needed without being damaged by the main rotor blade. Also, the housing reduces the risk of accidents due to inadvertent contact with the main rotor blade. The sealed air pockets 67 would enable the aircraft to float in the event of ditching over water.

Use of a peripherally weighted, high momentum kinetic energy, rapidly responsive, variable pitch main rotor blade permits the aircraft 10 to execute an emergency auto rotation by which the pilot may safely control the landing of the aircraft in case of power failure. The speed or rpm of the main rotor blade is maintained by the pilot rapidly lowering the collective control stick, which immediately decreases the pitch of the main rotor blade, followed by a rapid controlled descent and utilization of the main rotor blade's kinetic energy to slow the aircraft by the pilot pulling up on the collective control stick just before landing. The aileron flaps 75 may be raised when banking the aircraft to not only facilitate banking in the desired direction but to also provide a measure of drag to aid the rudder flap 34 in controlling slipping and sliding during banking. The cabin 12 may be located above the plane of the main rotor blade to facilitate egress when making an emergency landing in water. The tail rotor may be replaced with a second rotor blade that counter rotates to be the main rotor blade 52. The tail rotor blade may also be enshrouded for safety purposes and to isolate the tail rotor blade from the main rotor blade wash as well as from the effects of the relative wind. The vertical lift aircraft 10 exhibits increased lift, forward speed and safety while reducing pilot stress factors in an aircraft that is relatively lightweight and structurally and operationally uncomplicated.

Although the extension of the control slides radially outwardly from the housing in the neutral position contributes to stabilization of the aircraft and enhances lift during forward flight, the control slides may be disposed entirely within the housing in the neutral position. Accordingly, the outer edges of the control slides may be disposed entirely within the housing in the neutral position. The inner edges of the control slides may be disposed entirely within the housing in the neutral position but may also protrude a small amount from the housing into the downdraft area in the neutral position as shown in the drawings. The control slides being retracted from the downdraft area in the neutral position is thusly intended to encompass a maximally retracted position for the control slides, regardless of whether the control slides are retracted entirely from the downdraft area or protrude into the downdraft area from the housing. The operational position for the control slides is therefore intended to encompass a maximally extended position for the control slides in which the control slides extend further into the downdraft area than in the neutral position.

In as much as the present invention is subject to many variations, modifications and changes in detail, it is intended that all subject matter discussed above or shown in the accompanying drawings be interpreted as illustrative only and not be taken in a limiting sense.

What is claimed is:

1. A vertical lift aircraft comprising a cabin;

an enclosed rotary wing comprising an annular housing mounted to said cabin and having an inner wall circumscribing a space open at a top and at a bottom of said housing for air flow therethrough, and a flexible main rotor blade rotatably disposed in said space to provide vertical lift for said aircraft, said space including a downdraft area beneath said main rotor blade, said main rotor blade including a plurality of main rotor blade members having a symmetrically adjustable pitch to control vertical directional movements of said aircraft;

a power source for driving the main rotor blade to rotate; and a horizontal directional control for controlling horizontal movements of said aircraft during flight and comprising a plurality of control slides slidably disposed in corresponding slots in said housing, each of said control slides being selectively slidable in a direction radial to said housing between a neutral position in which said control slide is retracted from said downdraft area to an operational position in which said control slide is extended into said downdraft area, said aircraft moving horizontally in the direction of a selected one of said control slides moved to said operational position.

2. The vertical lift aircraft recited in claim 1 wherein said housing has a configuration of an airfoil.

3. The vertical lift aircraft recited in claim 1 wherein said cabin has a configuration of an airfoil.

4. The vertical lift aircraft recited in claim 1 wherein said main rotor blade is rotatable in a horizontal plane non-parallel to a longitudinal axis of said aircraft.

5. The vertical lift aircraft recited in claim 1 wherein an inner edge of each of said control slides is disposed adjacent said inner wall in said neutral position.

6. The vertical lift aircraft recited in claim 1 wherein said housing has an outer wall and each of said control slides has an outer edge disposed outwardly of said outer wall in said neutral position.

7. The vertical lift aircraft recited in claim 1 wherein said cabin is disposed beneath said housing.

8. The vertical lift aircraft recited in claim 1 wherein said housing encloses one or more sealed air pockets for buoyancy.

9. The vertical lift aircraft recited in claim 1 wherein said housing contains one or more storage compartments.

10. The vertical lift aircraft recited in claim 1 and further including landing gear attached to said cabin and including one or more longitudinal runners parallel to said longitudinal axis of said aircraft.

11. A vertical lift aircraft comprising a cabin;

an enclosed rotary wing comprising an annular housing attached to said cabin and a main rotor blade rotatably disposed in a space circumscribed by an inner circumference of said housing to provide vertical lift for said aircraft, said housing being parallel to a longitudinal axis of said aircraft and being perpendicular to a vertical axis of said aircraft, said main rotor blade including a plurality of main rotor blade members radial to and rotatable about a rotation axis tilted forwardly from said vertical axis of said aircraft, said space including a downdraft area beneath said main rotor blade members;

a power source for driving said main rotor blade to rotate; and a horizontal directional control for controlling horizontal directional movements of said aircraft during flight and comprising a plurality of planar control plates slidably disposed in corresponding radial slots in said housing and an operating member for each of said control plates, a first one of said control plates being disposed at a forward location on said housing, a second one of said control plates being disposed at a rearward location on said housing, a third one of said control plates being disposed at a port location on said housing, a fourth one of said control plates being disposed at a starboard location on said housing, each of said control plates being slidable by the corresponding one of said operating members inwardly and outwardly in a radial direction of movement, said control plates being individually slidably radially outwardly to a neutral position in which said control plates are maximally retracted from said downdraft area and being individually slidable radially inwardly from said neutral position to an operational position in which said control plates are maximally extended into said downdraft area to obstruct a portion of said downdraft area, said aircraft moving horizontally in the direction of a single selected one of said control plates moved to said operational position, said aircraft moving horizontally in a direction between a selected pair of adjacent ones of said control plates moved to said operational position.

12. The vertical lift aircraft recited in claim 11 wherein said vertical rotation axis is tilted forwardly about three to five degrees from said vertical axis of said aircraft.

13. The vertical lift aircraft recited in claim 11 wherein said control plates in said operational position are closely spaced beneath said main rotor blade.

14. The vertical lift aircraft recited in claim 11 wherein each of said control plates is supported between upper and lower rollers in the corresponding one of said slots.

15. The vertical lift aircraft recited in claim 14 wherein said operating member for each of said control plates comprises a roller, said rollers being rotatable in first and second directions to move the corresponding one of said control plates outwardly and inwardly in said direction of radial movement.

16. The vertical lift aircraft recited in claim 15 wherein said operating member includes a servomechanism operated via a cyclic control in said cabin.

17. The vertical lift aircraft recited in claim 11 and further including aileron flaps along a top of said housing at said port and starboard locations, said aileron flaps being selectively pivotal via a cyclic control in said housing.

18. A vertical lift aircraft comprising a cabin;

an enclosed rotary wing comprising an annular housing mounted to said cabin and a main rotor blade of variable pitch rotatably disposed in a space circumscribed by an inner circumference of said housing to provide vertical lift for said aircraft, said space including a downdraft area beneath said main rotor blade;

a tail rotor mounted to said cabin and including a rotatable tail rotor blade;

a power source for driving said main rotor blade and said tail rotor blade to rotate;

a collective control in said cabin for changing said pitch of said main rotor blade symmetrically during flight to control vertical directional movements of said aircraft during flight;

a rudder control in said cabin for selectively rotating said tail rotor blade to control rotational directional movements of said aircraft during flight;

a horizontal directional control for controlling horizontal directional movements of said aircraft during flight and comprising a plurality of control slides slidably disposed at 90 degree spaced locations along said housing corresponding to the cardinal directions, each of said control slides having a retracted position in which said control slide is retracted from said downdraft area, each of said control slides being movable in a radially inward direction from said retracted position to an extended position in which said control slide is extended into said downdraft area and obstructs about four to five percent of said downdraft area;

a cyclic control in said cabin adapted to selectively move a selected one of said control slides from said retracted position to said extended position after take-off to effect horizontal directional turning of said aircraft in the cardinal direction of said selected one of said control slides, said cyclic control being further adapted to selectively move a selected pair of adjacent ones of said control slides from said retracted position to said extended position to effect horizontal directional turning of said aircraft in a direction between the cardinal directions of said selected pair of said control slides.

19. A vertical lift aircraft recited in claim 18 wherein said main rotor blade comprises a flexible main rotor blade having a plurality of peripherally weighted, high momentum kinetic energy, rapidly responsive, variable pitch main rotor blade.

20. A vertical lift aircraft recited in claim 18 wherein said tail rotor further includes a selectively pivotal rudder flap and a plurality of selectively pivotal elevator flaps.

* * * * *